(12) United States Patent
Allore et al.

(10) Patent No.: US 12,321,083 B2
(45) Date of Patent: Jun. 3, 2025

(54) CAMERA ALIGNMENT

(71) Applicant: Google LLC, Mountain View, CA (US)

(72) Inventors: Joseph Allore, Mundelein, IL (US);
Ding Ran Dai, Chicago, IL (US);
Michael J. Lombardi, South Barrington, IL (US); David Kyungtag Lim, Glenview, IL (US)

(73) Assignee: Google LLC, Mountain View, CA (US)

( * ) Notice: Subject to any disclaimer, the term of this patent is extended or adjusted under 35 U.S.C. 154(b) by 5 days.

(21) Appl. No.: 18/488,921

(22) Filed: Oct. 17, 2023

(65) Prior Publication Data
US 2025/0123539 A1  Apr. 17, 2025

(51) Int. Cl.
*G03B 17/02* (2021.01)
(52) U.S. Cl.
CPC ................................... *G03B 17/02* (2013.01)
(58) Field of Classification Search
None
See application file for complete search history.

(56) References Cited

U.S. PATENT DOCUMENTS

| | | | |
|---|---|---|---|
| 2021/0278754 A1 | 9/2021 | Boyes et al. | |
| 2021/0281729 A1 | 9/2021 | Queeney et al. | |
| 2024/0241224 A1* | 7/2024 | Qu | G01S 17/894 |

FOREIGN PATENT DOCUMENTS

| | | |
|---|---|---|
| WO | 2021036846 A1 | 3/2021 |
| WO | 2021104016 A1 | 6/2021 |

* cited by examiner

*Primary Examiner* — Rodney E Fuller
(74) *Attorney, Agent, or Firm* — Shumaker & Sieffert, P.A.

(57) ABSTRACT

A computing device may include camera modules and a camera enclosure configured to house the camera modules. The computing device may further include alignment wedges that each define a sloped surface configured to mechanically contact at least one of the camera enclosure or the camera modules. The alignment wedges may be configured to reposition the respective camera module of the plurality of camera modules with respect to the camera enclosure.

15 Claims, 8 Drawing Sheets

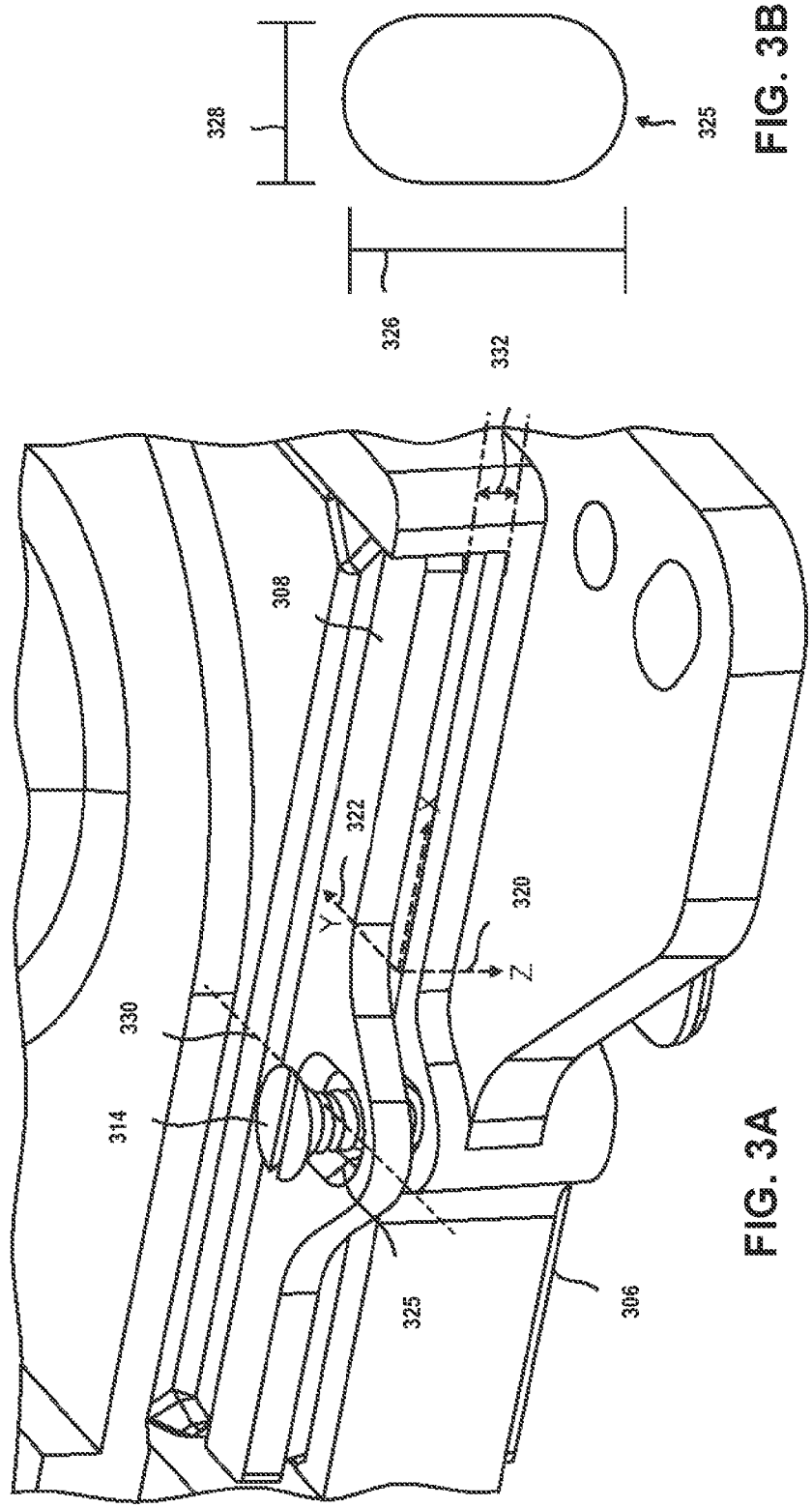

CAMERA ALIGNMENT

BACKGROUND

Computing devices such as so-called smartphones, tablets, and the like may include one or more cameras for capturing photographs and videos. The cameras may be built-in modules integrated into the computing device. The cameras typically include an image sensor, lens assembly, and supporting hardware components. The image sensor may capture incoming light and convert it into an electronic signal. The lens assembly may include one or more lenses that focus and direct light onto the sensor. In some examples, the cameras may be controlled through a dedicated camera application, allowing users to adjust settings, apply filters, and access various shooting modes.

SUMMARY

In general, this disclosure is directed to an alignment module that facilitates the precise alignment of camera modules of a computing device. In some examples, the alignment module may include a camera enclosure and alignment wedges that define a sloped surface. Adjustment of the alignment wedges may result in repositioning camera modules with respect to the camera enclosure in a highly controlled fashion, which may decrease manufacturing costs. The alignment wedges may also be secured to the camera enclosure in a reversible manner (e.g., using screws that can be easily removed), which may improve the repairability of the computing device.

In some examples, a computing device includes: a plurality of camera modules; a camera enclosure configured to house the plurality of camera modules; and a plurality of alignment wedges, wherein each alignment wedge of the plurality of alignment wedges defines a sloped surface configured to mechanically contact at least one of the camera enclosure or a respective camera module of the plurality of camera modules, and wherein each alignment wedge of plurality of alignment wedges is configured to reposition the respective camera module of the plurality of camera modules with respect to the camera enclosure.

In some examples, a method includes positioning a plurality of camera modules within a camera enclosure; and repositioning the plurality of camera modules with respect to the camera enclosure using a plurality of alignment wedges, wherein each alignment wedge of the plurality of alignment wedges defines a sloped surface configured to mechanically contact at least one of the camera enclosure or a respective camera module of the plurality of camera modules, and wherein each alignment wedge of plurality of alignment wedges is configured to reposition the respective camera module of the plurality of camera modules.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 3A is a conceptual diagram of a camera enclosure and one or more alignment wedges in accordance with aspects of this disclosure.

FIG. 3B is a conceptual diagram of a screw opening in accordance with aspects of this disclosure.

DETAILED DESCRIPTION

Figure 1A:
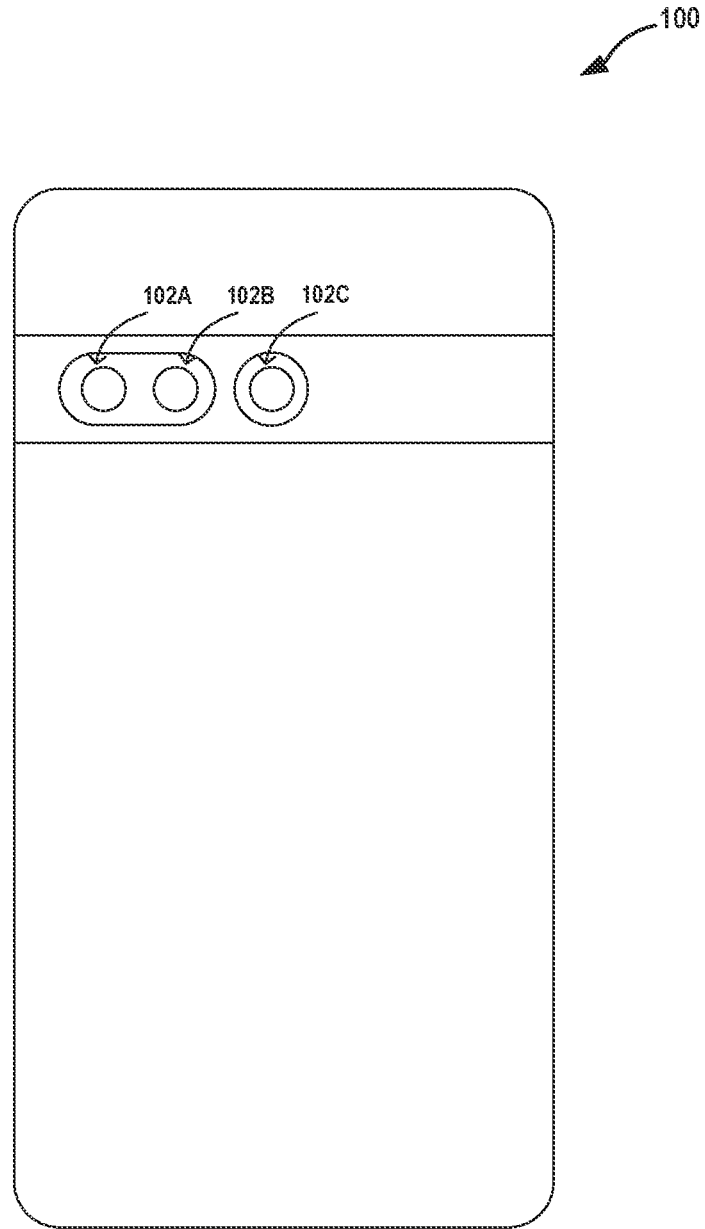
FIGS. 1A-1E are conceptual diagrams of a computing device that includes a camera enclosure and one or more alignment wedges in accordance with aspects of this disclosure.

FIG. 1A is a conceptual diagram illustrating an example computing device 100. Examples of computing device 100 may include, but are not limited to, a mobile phone (including a so-called "smartphone"), a foldable computing device, smart glasses, a smart watch, a laptop computer, an ambient computing device (including a so-called "smart display"), and the like. As shown in FIG. 1A, computing device 100 may include one or more camera modules, such as camera modules 102A-102C (collectively, "camera modules 102").

Figure 1B:
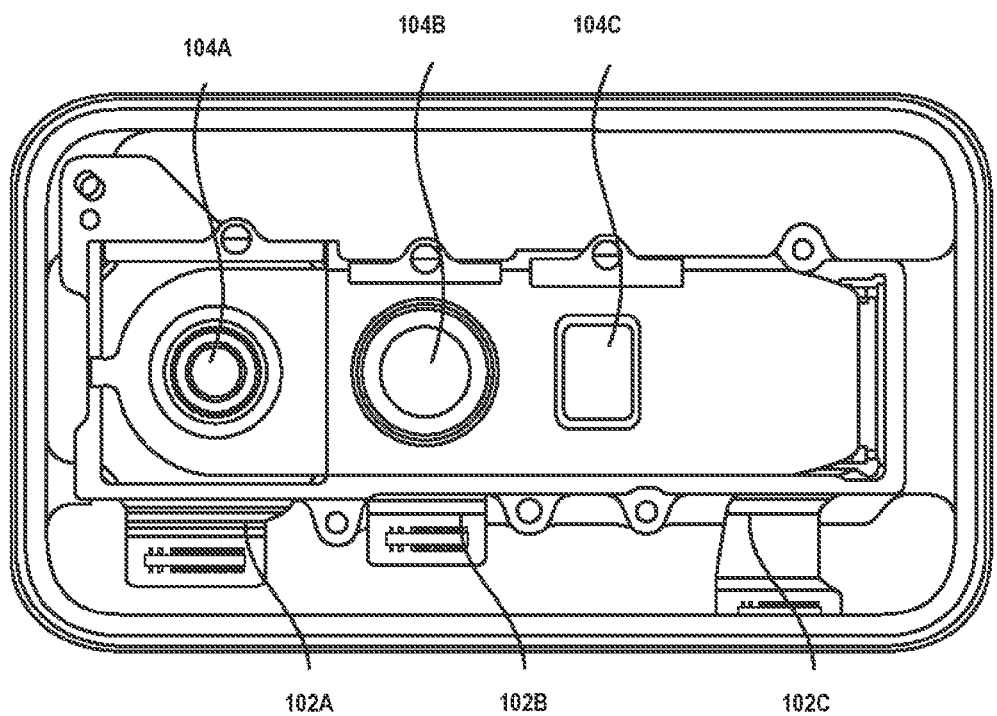

FIG. 1B is a conceptual diagram illustrating camera modules 102 in greater detail. Camera modules 102 may include one or more cameras, such as cameras 104A-104C (collectively, "cameras 104"). Each of cameras 104 may include an image sensor, lens assembly, and supporting hardware components. An image sensor may capture incoming light and convert it into an electronic signal. A lens assembly may include one or more lenses that focus and direct light onto the image sensor. Supporting hardware, such as image signal processors (ISPs), autofocus mechanisms, optical image stabilization (OIS), and computational photography algorithms, may further enhance the performance and capabilities of cameras 104. In some examples, cameras 104 may be controlled through a dedicated camera application installed by computing device 100, allowing a user to adjust settings, apply filters, access various shooting modes, etc.

In some examples, computing device 100 may include one or more cameras facing in a direction generally opposite of a display panel of computing device 100. A camera having this configuration may be referred to as a rear-facing camera. In general, cameras 104 may include a camera body (e.g., defined within computing device 100). Additionally or alternatively, cameras 104 may be integrated into computing device 100 such that lenses of cameras 104 faces a user of computing device 100 when the user is looking at a display panel of computing device 100. A camera having this configuration may be referred to as a front-facing camera.

In general, precisely positioning cameras 104 is important for the performance of cameras 104, particularly when computing device 100 includes multiple cameras. For example, precise camera alignment may help ensure accurate depth estimation by reducing or eliminating parallax errors (e.g., a perceived shift in an object's position when viewed from different angles). Furthermore, for features like wide-angle shots (e.g., panorama shots), computing device 100 may need to stitch the images captured by cameras 104 to create one seamless image. If cameras 104 are not precisely positioned and calibrated relative to each other, there may be visible seams, distortions, or discrepancies in the final image. In addition, precise alignment of cameras 104 may be critical for smooth transition between different levels of zoom. Any misalignment may result in a jarring shift in the image during zooming.

Figure 1C:
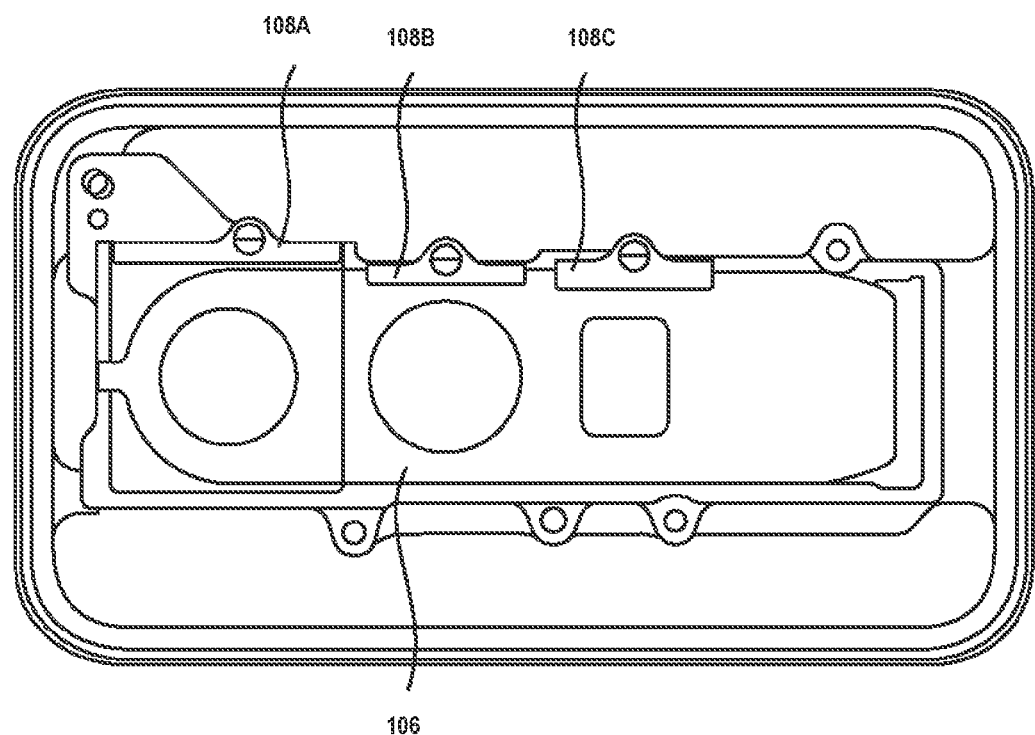

In accordance with aspects of this disclosure, computing device 100 may include a camera enclosure 106 and one or more alignment wedges, such as alignment wedges 108A-108C (collectively, "alignment wedges 108"). FIG. 1C is a conceptual diagram illustrating camera enclosure 106 and alignment wedges 108. Alignment wedges 108 may be in mechanical contact with camera modules 102 and camera enclosure 106 and configured to move in a highly controlled fashion relative to camera enclosure 106. In this way, alignment wedges 108 may be configured to reposition camera modules 102 with respect to camera enclosure within tight tolerances, which may increase the reliability of manufacturing of computing device 100 while reducing costs.

Figure 1D:
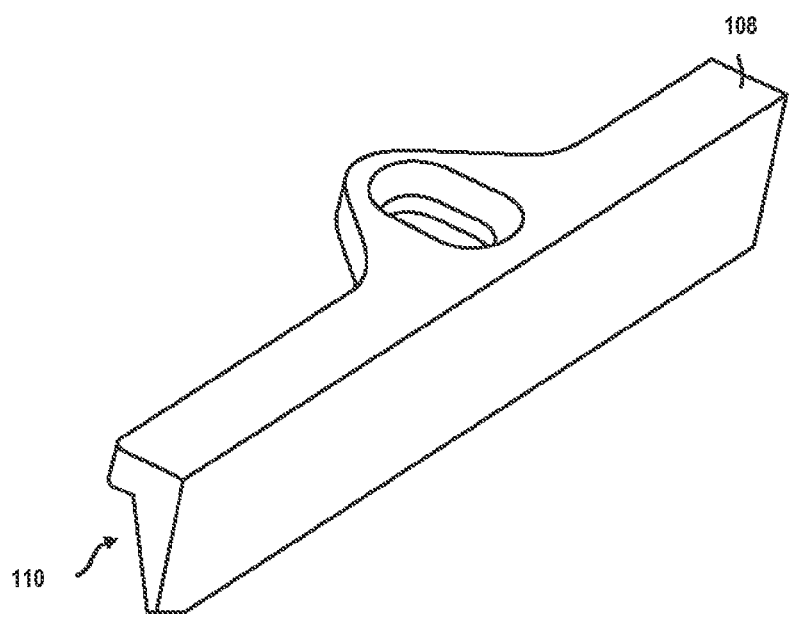

In general, computing device 100 may include any number of alignment wedges 108. For example, computing device 100 may include more alignment wedges 108 than camera modules 102, fewer alignment wedges 108 than camera modules 102, or the same number of alignment wedges 108 as camera modules 102. As shown in FIG. 1D, alignment wedges 108 may define a sloped surface 110 (e.g., a surface that is at an angle between 0 degrees and 90 degrees). Sloped surface 110 may be configured to mechanically contact at least one of camera enclosure 106 or camera modules 102. In some examples, camera enclosure 106 or camera modules 102 may define a sloped surface corresponding to sloped surface 110. Alignment wedges 108 may be formed from any suitable material (e.g., aluminum, steel, brass, plastic, etc.).

As mentioned above, alignment wedges 108 may be configured to move in a highly controlled fashion relative to camera enclosure 106. In other words, the movement of alignment wedges 108 may be precisely and reliably adjusted to ensure the position of alignment wedges 108 satisfies desired parameters. In turn, alignment wedges 108, which is in mechanical contact with camera modules 102, may correspondingly move camera modules 102 with respect to camera enclosure 106, repositioning camera modules 102 by precise incremental amounts.

Figure 1E:
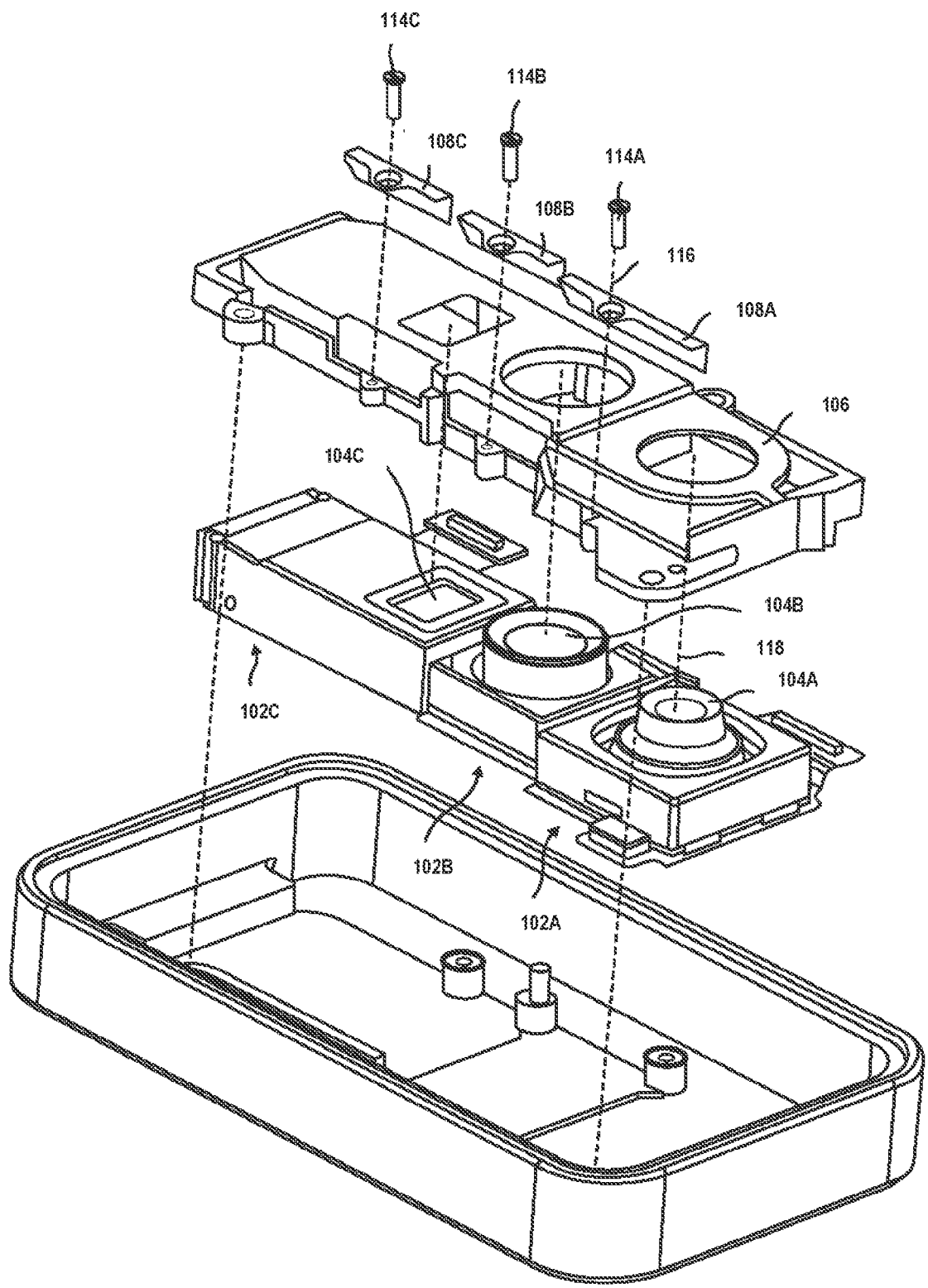

Alignment wedges 108 may be affixed to camera enclosure 106. For example, as shown in FIG. 1E, alignment wedges 108A-108C may be affixed to camera enclosure 106 by screws 114A-114C (collectively, "screws 114"). Screws 114 may have a longitudinal axis 116 (only one of which is labeled for case of illustration) that is substantially parallel to an optical axis 118 (only one of which is labeled for case of illustration) of camera modules 102.

Using screws 114 may be more advantageous than using other fixation methods, such as glue. For example, screws 114 may allow for easy disassembly of components or parts, which may be useful in scenarios where maintenance, repairs, or upgrades are required. Glued components can be challenging to separate without causing damage, whereas screws 114 can be removed and reinserted multiple times. Additionally, screws 114 provides the ability to adjust the tightness of the connection, which may be crucial when joining parts that need to be aligned precisely.

Alignment wedges 108 may be configured to reposition camera modules 102 by an amount corresponding to a degree of fixation of alignment wedges 108 with respect to camera enclosure 106. In examples where alignment wedges 108 is affixed to camera enclosure by screws 114, a degree of rotation of screws 114 with respect to camera enclosure 106 may correspond to the degree of fixation of alignment wedges 108 with respect to camera enclosure 106. When manufacturing computing device 100, a sensor may measure the degree of rotation of screws 114 and/or the torque being applied to screws 114 when positioning camera modules 102.

Figure 2:
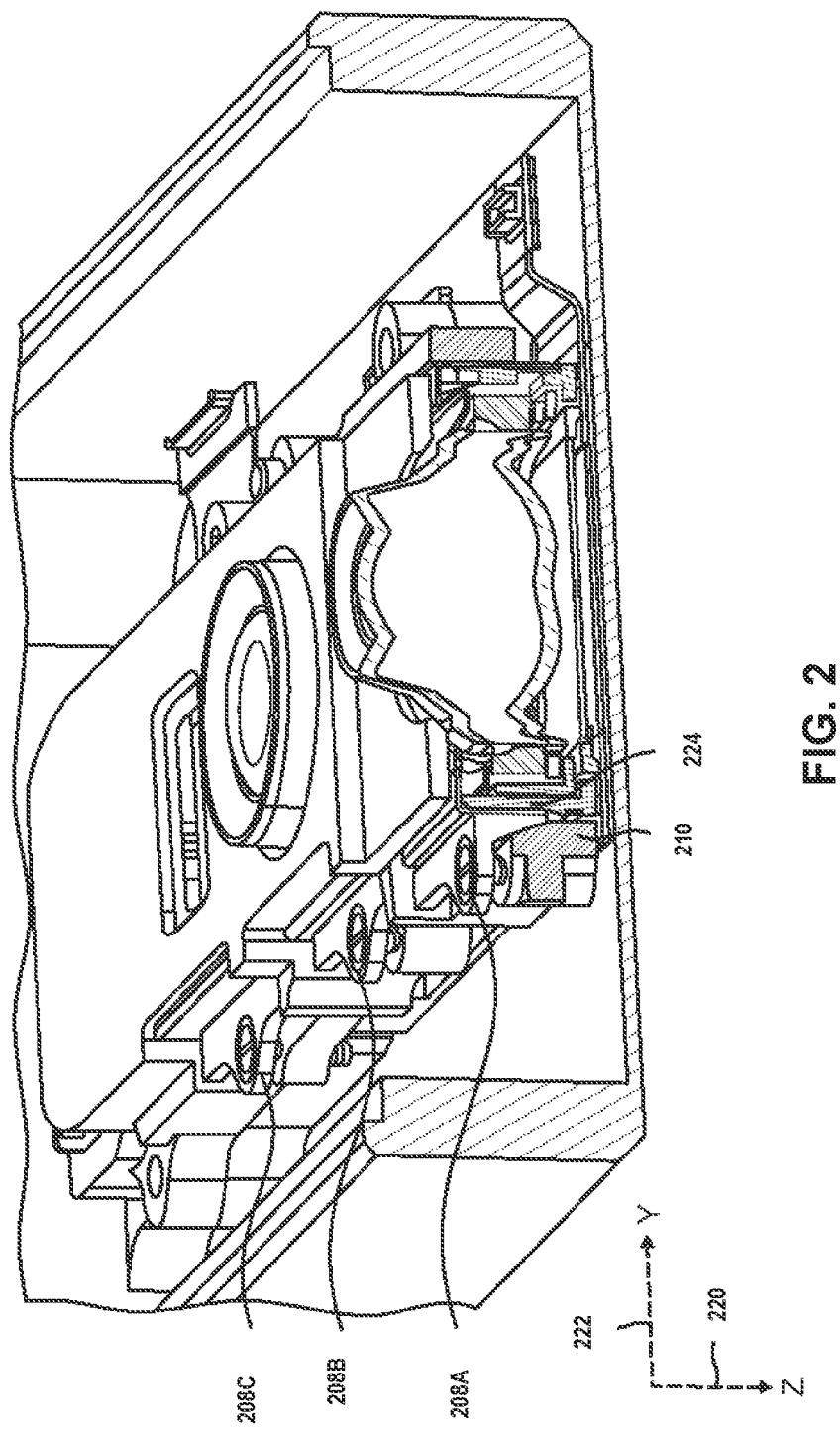
FIG. 2 is a conceptual diagram of a camera enclosure and one or more alignment wedges in accordance with aspects of this disclosure.

FIG. 2 is a conceptual diagram illustrating a camera enclosure 206 and alignment wedges 208A-208C (collectively, "alignment wedges 208"). Camera enclosure 206 is one example of camera enclosure 106 shown in FIGS. 1A-1D, and alignment wedges 208 are one example of alignment wedges 108 shown in FIGS. 1A-1D. As shown in FIG. 2, as alignment wedges 208 are fastened to camera enclosure 206 along a first axis 220, alignment wedges 208 may move along a second axis 222 due to a sloped surface 210 (only one of which is labeled for ease of illustration) of alignment wedges 208. In some examples, sloped surface 210 of alignment wedges 208 may be in mechanical contact with a sloped surface 224 (only one of which is labeled for ease of illustration) of camera enclosure 206.

The ratio of movement of alignment wedges 208 along first axis 220 and second axis 222 may be a function of the angle (which can also be referred to as a mating angle) of sloped surface 210. For example, if the angle is 20 degrees, then as alignment wedges 208 move by about 0.55 millimeters along first axis 220 (e.g., in a +z direction), alignment wedges 208 may "drive" about 0.20 millimeters along second axis 222 (e.g., in a +y direction). If the angle is 35 degrees, then as alignment wedges 208 move by about 0.28 millimeters along first axis 220 (e.g., in a +z direction), alignment wedges 208 may "drive" about 0.20 millimeters along second axis 222 (e.g., in a ty direction).

In any case, as alignment wedges 208 move along second axis 222, alignment wedges 208 may press against camera modules 202 (which are one example of camera modules 102 shown in FIG. 1) positioned in camera enclosure 206, thereby moving camera modules 202 relative to camera enclosure 206. Alignment wedges 208 may be configured to secure camera modules 202 with respect to camera enclosure 206 by pressing camera modules 202 against camera enclosure 206.

FIG. 3A is a conceptual diagram illustrating a camera enclosure 306 and an alignment wedges 308. Camera enclosure 306 is one example of camera enclosure 106 shown in FIGS. 1A-1D, and alignment wedges 308 are one example of alignment wedges 108 shown in FIGS. 1A-1D. As shown in FIG. 3A, alignment wedges 208 may define a screw opening 325 sized to receive screws 314 (which are one example of screws 114 shown in FIGS. 1A-1D).

In some examples screw opening 325 may have a first length 326 (shown in FIG. 3B) longer than a second length 328 (shown in FIG. 3B), where first length 326 is parallel with an axis 330 (shown in FIG. 3A) of alignment wedges 208. First length 326 of screw opening 325 may be sized to allow movement of alignment wedges 308 in a direction substantially parallel with first length 326. This direction may also be substantially parallel to a second axis 322 (which is an example of second axis 222 shown in FIG. 2). Second length 328 of screw opening 325 may be sized to prevent or otherwise resist movement of alignment wedges 308 in a direction substantially parallel with second length 328.

In some examples, the underside of the screwhead of screws 314 may be beveled, and screw opening 325 may have a corresponding bevel (e.g., screw opening 325 may be mirror image beveled). The bevels of screws 314 and screw opening 325 may allow alignment wedges 308 to slide along second axis 322 but help resist movement in a direction substantially parallel with second length 328.

When screw 314 is not fully disposed in screw opening 325, a gap 332 may exist between camera enclosure 306 and alignment wedges 308. As alignment wedges 308 is fastened to camera enclosure 306, alignment wedges 308 may move along a first axis 320 (which is an example of first axis 220 shown in FIG. 2), decreasing gap 332. In some examples, when alignment wedges 308 is fully fastened, gap 332 may disappear such that alignment wedges 308 is flush against camera enclosure 306.

Figure 4B:
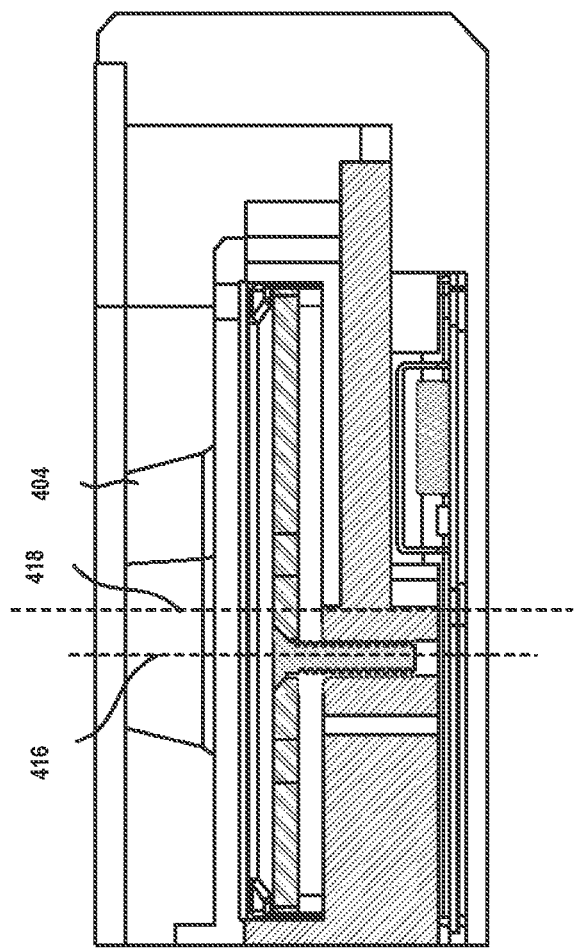
FIGS. 4A and 4B is a conceptual diagram of a camera enclosure and one or more alignment wedges in accordance with aspects of this disclosure.
Figure 4A:
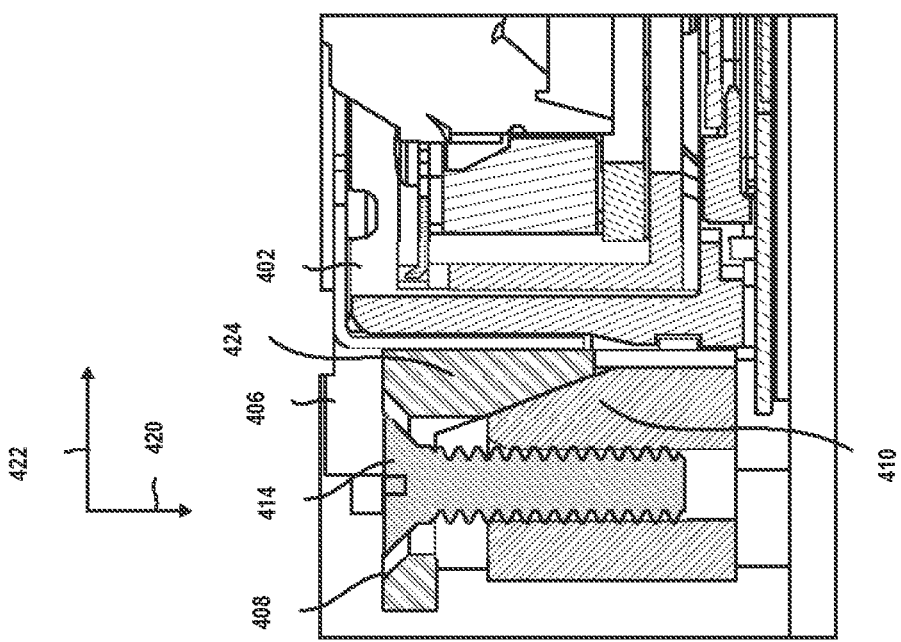

FIGS. 4A and 4B are conceptual diagrams illustrating a camera enclosure 406 and an alignment wedge 408. Camera enclosure 406 is one example of camera enclosure 106 shown in FIGS. 1A-1D, and alignment wedge 408 is one example of alignment wedge 408 shown in FIGS. 1A-1D. As shown in FIG. 4A, a screw 414 (which is one example of screws 114 shown in FIGS. 1A-1D) may fasten alignment wedge 408 to camera enclosure 406 along a first axis 420 (which is one example of first axis 220 shown in FIG. 2). As a result, alignment wedges 208 may move along a second axis 422 (which is one example of second axis 222 shown in FIG. 2) due to a sloped surface 410 of alignment wedge 408, thereby pressing against (and securing) a camera module 402. In some examples, sloped surface 410 of alignment wedge 408 may be in mechanical contact with a sloped surface 424 of camera enclosure 406. As shown in FIG. 4B, a longitudinal axis 416 of screw 414 may be substantially parallel with first axis 420 and an optical axis 418 of camera 404 (which is one example of cameras 104 shown in FIGS. 1A-1D).

Figure 5:
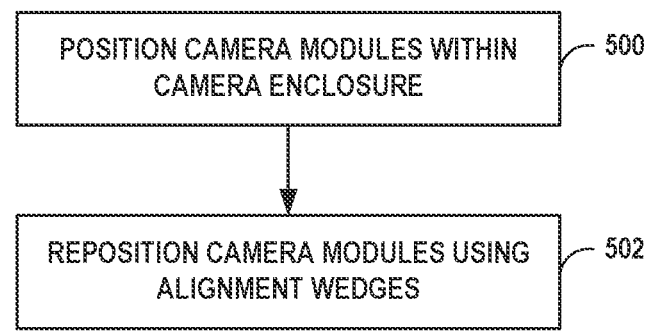
FIG. 5 is a flowchart illustrating an example technique for aligning cameras of a computing device in accordance with aspects of this disclosure.

FIG. 5 is a flowchart illustrating an example technique for aligning cameras of a computing device in accordance with one or more aspects of the present disclosure. Although the example operation of FIG. 5 is described as being performed in the context of FIGS. 1A-1D, in other examples some or all of the example operation may be performed in the context of other figures.

Camera modules 102 may be positioned within camera enclosure 106 (500). Alignment wedges 108 may then be used to align and secure camera modules 102 (502). For example, alignment wedges 108 may be affixed to camera enclosure 106 using screws 114. Depending on the degree of fixation of alignment wedges 108, alignment wedges 108 may move relative to camera enclosure 106. Alignment wedges 108 may be in mechanical contact with camera modules 102, so when alignment wedges 108 move, alignment wedges 108 may press against camera modules 102, thereby repositioning camera modules 102 relative to camera enclosure 106. At some point, alignment wedges 108 may press camera modules 102 against camera enclosure 102, securing camera modules 102 (e.g., resisting movement and rotation of camera modules 102). As mentioned above, alignment wedges 108 may define sloped surface 110 configured to mechanically contact at least one of camera enclosure 106 or camera modules 102.

The following numbered examples may illustrate one or more aspects of the disclosure:

Example 1: A computing device includes a plurality of camera modules; a camera enclosure configured to house the plurality of camera modules; and a plurality of alignment wedges, wherein each alignment wedge of the plurality of alignment wedges defines a sloped surface configured to mechanically contact at least one of the camera enclosure or a respective camera module of the plurality of camera modules, and wherein each alignment wedge of plurality of alignment wedges is configured to reposition the respective camera module of the plurality of camera modules with respect to the camera enclosure.

Example 2: The computing device of example 1, wherein each alignment wedge of the plurality of alignment wedges is configured to reposition the respective camera module of the plurality of camera modules by an amount corresponding to a degree of fixation of the alignment wedge with respect to the camera enclosure.

Example 3: The computing device of example 2, wherein each alignment wedge of the plurality of alignment wedges is affixed to the camera enclosure by at least one screw, and wherein a degree of rotation of the at least one screw with respect to the camera enclosure corresponds to the degree of fixation of the alignment wedge with respect to the camera enclosure.

Example 4: The computing device of example 3, wherein each alignment wedge of the plurality of alignment wedges defines a screw opening having a first length longer than a second length, and wherein the first length is parallel with a longitudinal axis of the respective alignment wedge.

Example 5: The computing device of example 4, wherein the first length of the screw opening for each alignment wedge of the plurality of alignment wedges is sized to allow movement of the alignment wedge in a direction substantially parallel with the first length.

Example 6: The computing device of any of examples 3 through 5, wherein the at least one screw has a longitudinal axis that is substantially parallel to an optical axis of at least one camera module of the plurality of camera modules.

Example 7: The computing device of any of examples 1 through 6, wherein at least one alignment wedge of the plurality of alignment wedges is configured to secure the at least one respective camera module with respect to the camera enclosure by pressing the at least one respective camera module against the camera enclosure.

Example 8: A method includes positioning a plurality of camera modules within a camera enclosure; and repositioning the plurality of camera modules with respect to the camera enclosure using a plurality of alignment wedges, wherein each alignment wedge of the plurality of alignment wedges defines a sloped surface configured to mechanically contact at least one of the camera enclosure or a respective camera module of the plurality of camera modules, and wherein each alignment wedge of plurality of alignment wedges is configured to reposition the respective camera module of the plurality of camera modules.

Example 9: The method of example 8, wherein repositioning the plurality of camera modules includes: repositioning, by each alignment wedge of the plurality of alignment wedges, the respective camera module of the plurality of camera modules by an amount corresponding to a degree of fixation of the alignment wedge with respect to the camera enclosure.

Example 10: The method of example 9, wherein each alignment wedge of the plurality of alignment wedges is affixed to the camera enclosure by at least one screw, and wherein a degree of rotation of the at least one screw with respect to the camera enclosure corresponds to the degree of fixation of the alignment wedge with respect to the camera enclosure.

Example 11: The method of example 10, wherein each alignment wedge of the plurality of alignment wedges defines a screw opening having a first length longer than a second length, and wherein the first length is parallel with a longitudinal axis of the respective alignment wedge.

Example 12: The method of example 11, wherein the first length of the screw opening for each alignment wedge of the plurality of alignment wedges is sized to allow movement of the alignment wedge in a direction substantially parallel with the first length.

Example 13: The method of any of examples 10 through 12, wherein the at least one screw has a longitudinal axis that is substantially parallel to an optical axis of at least one camera module of the plurality of camera modules.

Example 14: The method of any of examples 8 through 13, further including securing, by at least one alignment wedge of the plurality of alignment wedges, the at least one respective camera module with respect to the camera enclosure by pressing the at least one respective camera module against the camera enclosure. Various examples have been described. These and other examples are within the scope of the following claims.

What is claimed is:

1. A computing device comprising:
a plurality of camera modules;
a camera enclosure configured to house the plurality of camera modules; and
a plurality of alignment wedges that are separate discrete components from the plurality of camera modules and the camera enclosure,
wherein each alignment wedge of the plurality of alignment wedges defines a sloped surface configured to mechanically contact at least one of the camera enclosure or a respective camera module of the plurality of camera modules, and
wherein each respective alignment wedge of plurality of alignment wedges is configured to move between the respective camera module and the camera enclosure to reposition the respective camera module of the plurality of camera modules with respect to the camera enclosure.

2. The computing device of claim 1, wherein each alignment wedge of the plurality of alignment wedges is configured to reposition the respective camera module of the plurality of camera modules by an amount corresponding to a degree of fixation of the alignment wedge with respect to the camera enclosure.

3. The computing device of claim 2, wherein each alignment wedge of the plurality of alignment wedges is affixed to the camera enclosure by at least one screw, and wherein a degree of rotation of the at least one screw with respect to the camera enclosure corresponds to the degree of fixation of the alignment wedge with respect to the camera enclosure.

4. The computing device of claim 3,
wherein each alignment wedge of the plurality of alignment wedges defines a screw opening having a first length longer than a second length, and
wherein the first length is parallel with a longitudinal axis of the respective alignment wedge.

5. The computing device of claim 4, wherein the first length of the screw opening for each alignment wedge of the plurality of alignment wedges is sized to allow movement of the alignment wedge in a direction substantially parallel with the first length.

6. The computing device of claim 3, wherein the at least one screw has a longitudinal axis that is substantially parallel to an optical axis of at least one camera module of the plurality of camera modules.

7. The computing device of claim 1, wherein at least one alignment wedge of the plurality of alignment wedges is configured to secure the at least one respective camera module with respect to the camera enclosure by pressing the at least one respective camera module against the camera enclosure.

8. A method comprising:
positioning a plurality of camera modules within a camera enclosure; and
repositioning the plurality of camera modules with respect to the camera enclosure using a plurality of alignment wedges that are separate discrete components from the plurality of camera modules and the camera enclosure,
wherein each alignment wedge of the plurality of alignment wedges defines a sloped surface configured to mechanically contact at least one of the camera enclosure or a respective camera module of the plurality of camera modules, and
wherein each respective alignment wedge of plurality of alignment wedges is configured to move between the respective camera module and the camera enclosure to reposition the respective camera module of the plurality of camera modules.

9. The method of claim 8, wherein repositioning the plurality of camera modules comprises:
repositioning, by each alignment wedge of the plurality of alignment wedges, the respective camera module of the plurality of camera modules by an amount corresponding to a degree of fixation of the alignment wedge with respect to the camera enclosure.

10. The method of claim 9, wherein each alignment wedge of the plurality of alignment wedges is affixed to the camera enclosure by at least one screw, and wherein a degree of rotation of the at least one screw with respect to the camera enclosure corresponds to the degree of fixation of the alignment wedge with respect to the camera enclosure.

11. The method of claim 10,
wherein each alignment wedge of the plurality of alignment wedges defines a screw opening having a first length longer than a second length, and
wherein the first length is parallel with a longitudinal axis of the respective alignment wedge.

12. The method of claim 11, wherein the first length of the screw opening for each alignment wedge of the plurality of alignment wedges is sized to allow movement of the alignment wedge in a direction substantially parallel with the first length.

13. The method of claim 10, wherein the at least one screw has a longitudinal axis that is substantially parallel to an optical axis of at least one camera module of the plurality of camera modules.

14. The method of claim 8, further comprising securing, by at least one alignment wedge of the plurality of alignment wedges, the at least one respective camera module with respect to the camera enclosure by pressing the at least one respective camera module against the camera enclosure.

15. A computing device comprising:
a plurality of camera modules;
a camera enclosure configured to house the plurality of camera modules; and
a plurality of alignment wedges,
wherein each alignment wedge of the plurality of alignment wedges defines a sloped surface configured to mechanically contact at least one of the camera enclosure or a respective camera module of the plurality of camera modules,
wherein each alignment wedge of plurality of alignment wedges is configured to reposition the respective camera module of the plurality of camera modules with respect to the camera enclosure,
wherein each alignment wedge of the plurality of alignment wedges is configured to reposition the respective camera module of the plurality of camera modules by an amount corresponding to a degree of fixation of the alignment wedge with respect to the camera enclosure, wherein each alignment wedge of the plurality of alignment wedges is affixed to the camera enclosure by at least one screw, and wherein a degree of rotation of the at least one screw with respect to the camera enclosure corresponds to the degree of fixation of the alignment wedge with respect to the camera enclosure, wherein each alignment wedge of the plurality of alignment wedges defines a screw opening having a first length longer than a second length, and wherein the first length is parallel with a longitudinal axis of the respective alignment wedge.

\* \* \* \* \*